US012730845B2

(12) United States Patent
Cauchois et al.

(10) Patent No.: US 12,730,845 B2
(45) Date of Patent: Sep. 8, 2026

(54) DATABASE-CONNECTED FORMS WITH VALIDATION RULES AND RESPONSE AUTOMATION

(71) Applicant: Notion Labs, Inc., San Francisco, CA (US)

(72) Inventors: William Henry Cauchois, New York, NY (US); Benjamin Isadore Hirsch, New York, NY (US); Simon Townsend-Last, New York, NY (US); Daniel Elliott Palmer, New York, NY (US); Rohan Jain, Hyderbad (IN)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/226,648

(22) Filed: Jun. 3, 2025

(65) Prior Publication Data

US 2026/0111493 A1 Apr. 23, 2026

Related U.S. Application Data

(60) Provisional application No. 63/779,914, filed on Mar. 28, 2025, provisional application No. 63/710,521, filed on Oct. 22, 2024.

(51) Int. Cl.
*G06F 16/903* (2019.01)

(52) U.S. Cl.
CPC .............................. *G06F 16/90335* (2019.01)

(58) Field of Classification Search
None
See application file for complete search history.

(56) References Cited

U.S. PATENT DOCUMENTS

| | | | | |
|---|---|---|---|---|
| 2010/0223557 | A1* | 9/2010 | Kenney | G06Q 10/10 707/E17.014 |
| 2015/0059003 | A1* | 2/2015 | Bouse | G06F 16/2379 726/28 |
| 2019/0236168 | A1* | 8/2019 | Vaswani | G06F 16/2358 |
| 2024/0144141 | A1* | 5/2024 | Cella | G06Q 30/0202 |

* cited by examiner

*Primary Examiner* — Jau Shya Meng
(74) *Attorney, Agent, or Firm* — Dorsey & Whitney LLP

(57) ABSTRACT

A computer system for creating and processing forms within block-based workspaces provides connections between form questions and database properties. The computer system enables creation of forms either from scratch or based on existing database structures, with each form question mapped to a database property. The computer system includes a form builder interface for configuring questions with validation rules, a sharing interface for distributing forms publicly or within workspaces, and automation capabilities for triggering actions based on responses. Forms can be customized with various question types, styling options, and validation rules while maintaining direct connection to the underlying database. The validation rules include configurable constraints for different question types. The form responses automatically populate workspace databases, enabling immediate analysis and workflow automation.

20 Claims, 9 Drawing Sheets

DATABASE-CONNECTED FORMS WITH VALIDATION RULES AND RESPONSE AUTOMATION

CROSS-REFERENCE TO PREVIOUSLY FILED APPLICATIONS

This application claims the benefit of and priority to U.S. Provisional Application No. 63/710,521, filed Oct. 22, 2024, and U.S. Provisional Application No. 63/779,914, filed Mar. 28, 2025, the contents of each which are incorporated by reference in their entireties.

BACKGROUND

Digital forms have evolved from simple data collection tools to graphical user interfaces that can gather structured information across organizations. Traditional form builders allow users to create questionnaires and surveys that can be shared with respondents to collect responses. However, these responses typically need to be exported and imported into other systems for analysis and action. Modern workspace platforms can provide collaborative environments where teams can organize information, communicate, and manage workflows. Form solutions have attempted to bridge data collection with workspace databases through manual data entry or basic integrations. However, existing solutions lack integration between form responses and workspace databases.

BRIEF DESCRIPTION OF THE DRAWINGS

Reference will now be made, by way of example, to the accompanying drawings, which show example embodiments of the present application and in which.

Figure 1:
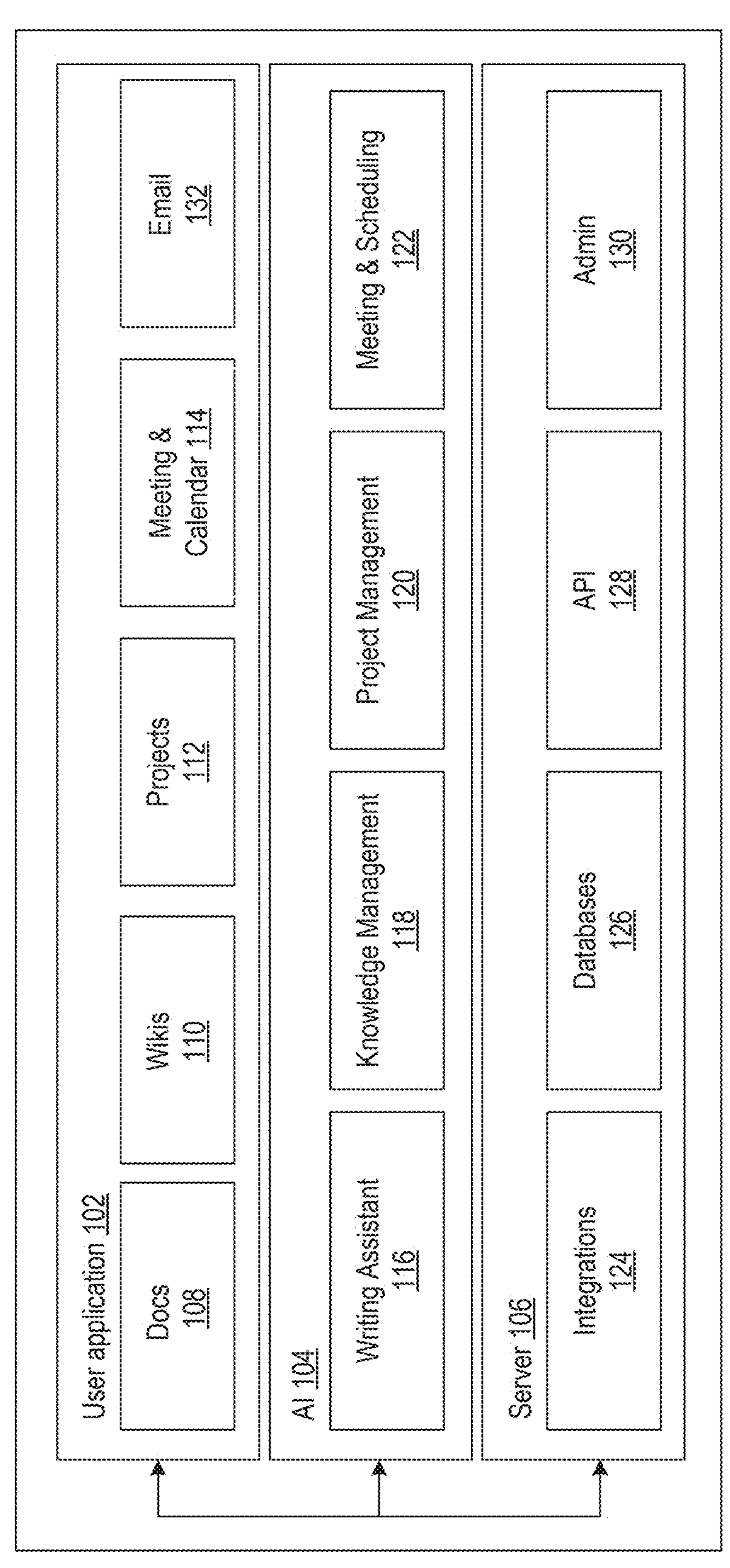
FIG. 1 is a block diagram of an example platform.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The rapid growth of digital collaboration has created a need for more efficient ways to collect and process information within workspace environments. Traditional digital forms exist in locations that are different from where teams actually work with the collected data. This can often require manual effort to transfer form responses into actionable formats. Previous approaches to digital forms relied on exporting form responses and importing them into workspace databases, leading to data silos and delayed analysis. Additionally, form validation was limited to basic required fields, while automation required complex external integrations. The methods disclosed herein connect digital forms to workspace databases, making responses available for analysis and automation. Each form question can map to a database property to provide structured data collection aligned with existing workflows. Response validation rules are implemented including field requirements, format verification, and conditional logic. When responses are submitted, they can trigger configurable automations that can send notifications, update related records, and integrate with external services.

The form builder interface disclosed herein enables users to quickly create forms by selecting existing database properties or defining new ones. Questions can be configured with validation rules that improve data quality. The sharing interface provides options for public links or embedded forms, with controls for response permissions and branding. Form responses automatically populate database entries, enabling immediate analysis through database views and charts. The disclosed systems enforce data quality through configurable rules for each question type. For example, text responses can have character limits and format requirements. Number and date fields can support range restrictions. Moreover, selection questions can enforce minimum and maximum choices. The validation occurs in real time as respondents complete the form.

The automation capabilities disclosed herein extend the value of form responses by triggering actions based on submission events and response values. Users can configure notifications to team members, updates to related database records, and integration with external services through webhooks. Custom variables can be defined using database formulas to enable complex automation logic. The disclosed systems maintain logs of automation execution for monitoring and troubleshooting. In addition, the integration of the forms with the block-based workspace model enables the forms to leverage existing database structures and permissions. Form responses can inherit database properties and can be displayed using customizable layouts. The block architecture enables forms to be embedded within other workspace content while maintaining their connection to source databases.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks'content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the /saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
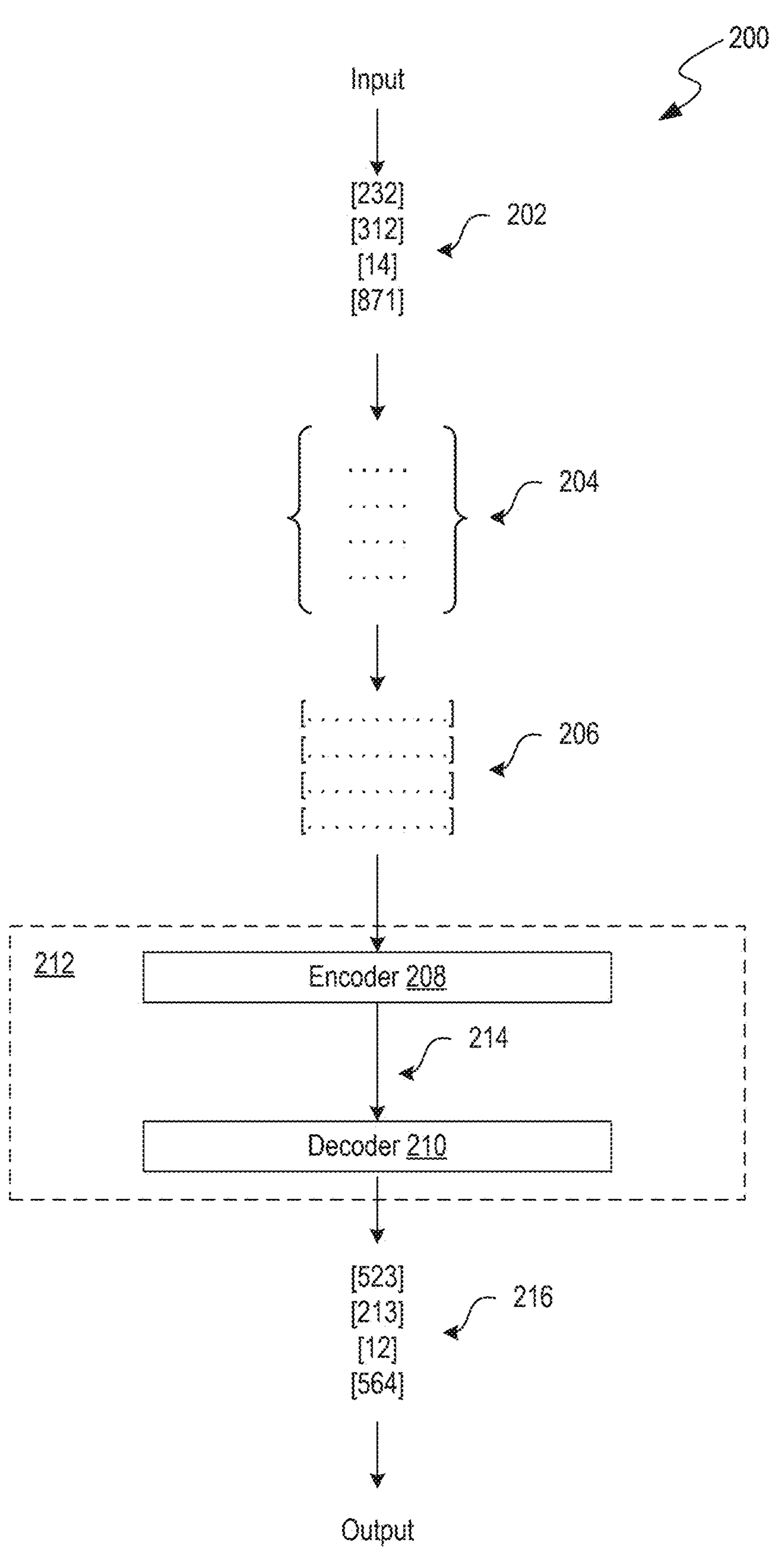
FIG. 2 is a block diagram of an example transformer.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
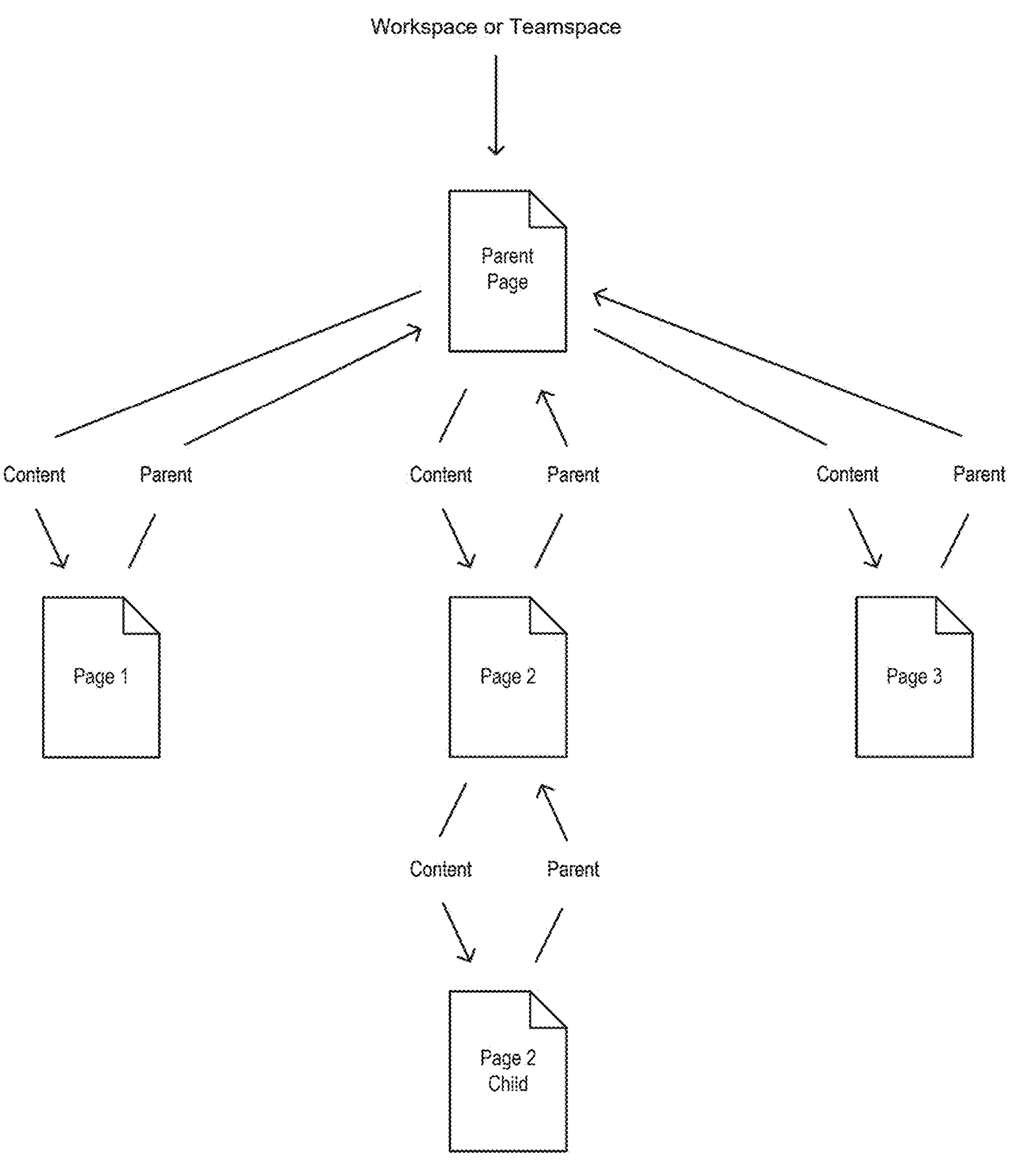
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Database-Connected Forms With Validation Rules and Response Automation

Figure 4:
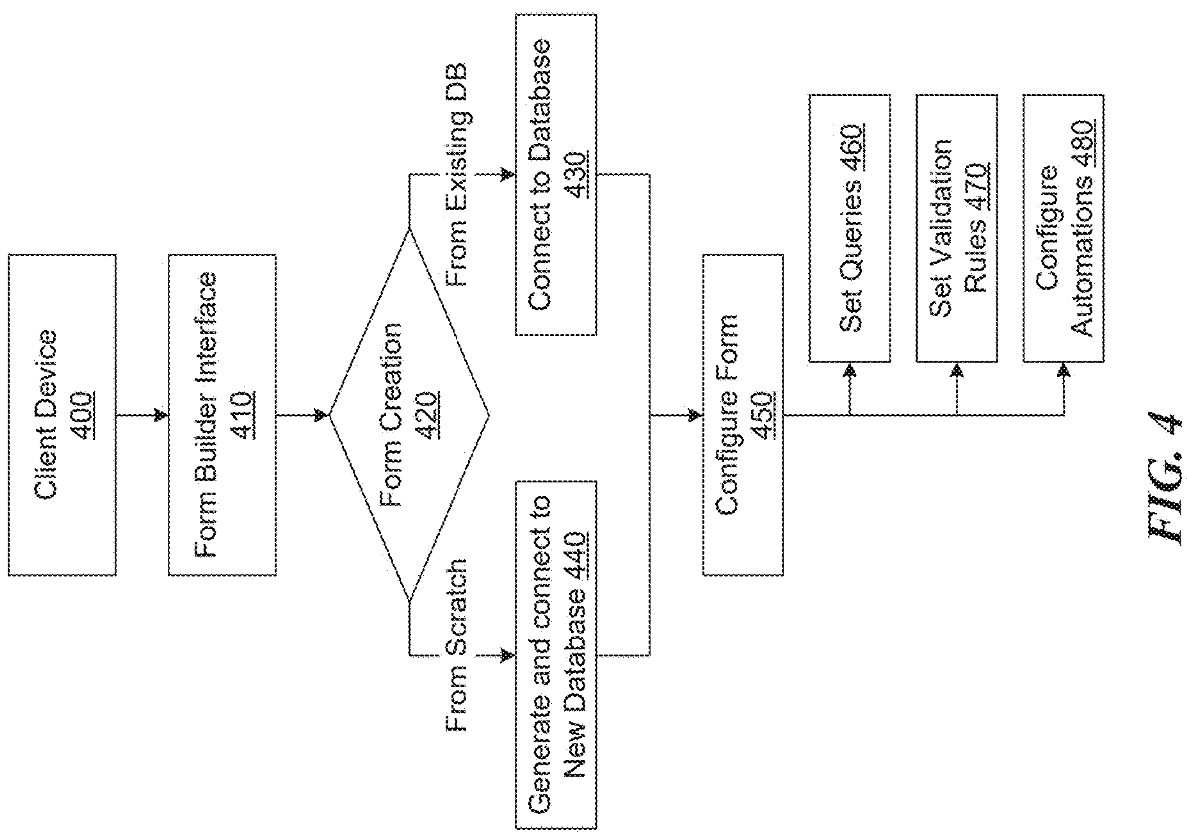
FIG. 4 shows a workflow to create a form.

FIG. 4 shows a workflow to create a form. The client device 400 can present a form builder interface 410, which enables the client device 400 to create the form.

In step 420, the client device 400 can specify various queries, as described in this application, to present to another user device. In addition, the client device 400 can specify multiple personas associated with the form, such as editor, submitter, and analyst. The editor can create, edit, and delete the form. The submitter can fill out the form, while the analyst can analyze the responses received from the form. The client device 400 can specify which one or more users belong to which persona by specifying user emails and the persona, a domain name and persona, or a name of a group of users and persona. For example, when the client device 400 specifies the domain name and the persona, all users that have access to that domain name have the permission to perform operations associated with the persona. In another example, the name of the group of users and persona can specify public and submitter, which indicates that any user can submit responses to the form. The name of the group of users can be an email list, a social media platform group name, etc.

The client device 400 can connect the form to an existing database in step 430 or to a completely new database in step 440. In step 450, the client device 400 can configure the form by indicating responses to which queries in the form can populate which database properties. There can be multiple forms for the same database. In effect, the form enables users with access to provide responses to enter records into the form and modify corresponding properties in the database without giving access to the whole database to the users.

In step 460, the client device 400 can specify the queries to include in the form. As described in this application, the client device 400 can provide a natural language description of the queries to include in the form, and an artificial intelligence (AI) can, based on the natural language description, generate the queries and populate the form.

In step 470, the client device 400 can provide the validation rules for the received responses. Specifically, each response can have a particular type, such as a text, numerical, matrix, ranked list, or multimedia, such as audio, video, or image. Also, each corresponding property in the database can have a type. For a response to be valid, the validation role can indicate that the type of the response needs to match the type of the property. In addition, the validation role can indicate that the property type in the database needs to exist. For example, the validation rule can detect problematic scenarios such as when the property in the database was deleted or the property in the database changed type and now has a different type from the response type.

In step 480, the client device can configure the automations associated with the form. The information can include a trigger that, when satisfied, causes an action to be performed. For example, automations can define what happens when an entry is received, such as sending an email, sending a Slack message, etc., as described in more detail in this application.

Before publishing, the client device 400 can define permissions associated with the form, such as the users that can submit responses to the form, the users that can see results, and whether the system collects information about users that submitted the response. In addition, the permissions can define how the form is shared by specifying specific users who have access to the form or by specifying a group having access to the form, such as the public or a named group, such as an email list, or an organized group and a social media platform. Alternatively, the group can be specified by specifying a domain name, and all users that have access to the domain name can have access to the form. The permissions can also indicate whether the user with access can share the form with others or whether the form is not shareable. Once the form construction is complete, the client device 400 can close the form, preventing addition of new entries. The client device 400 can indicate how to share the form, such as to a particular domain, to certain individuals, to a third-party website, and/or publicly. The final form can be created into a template and offered to other users at the beginning of form creation.

Figure 5:
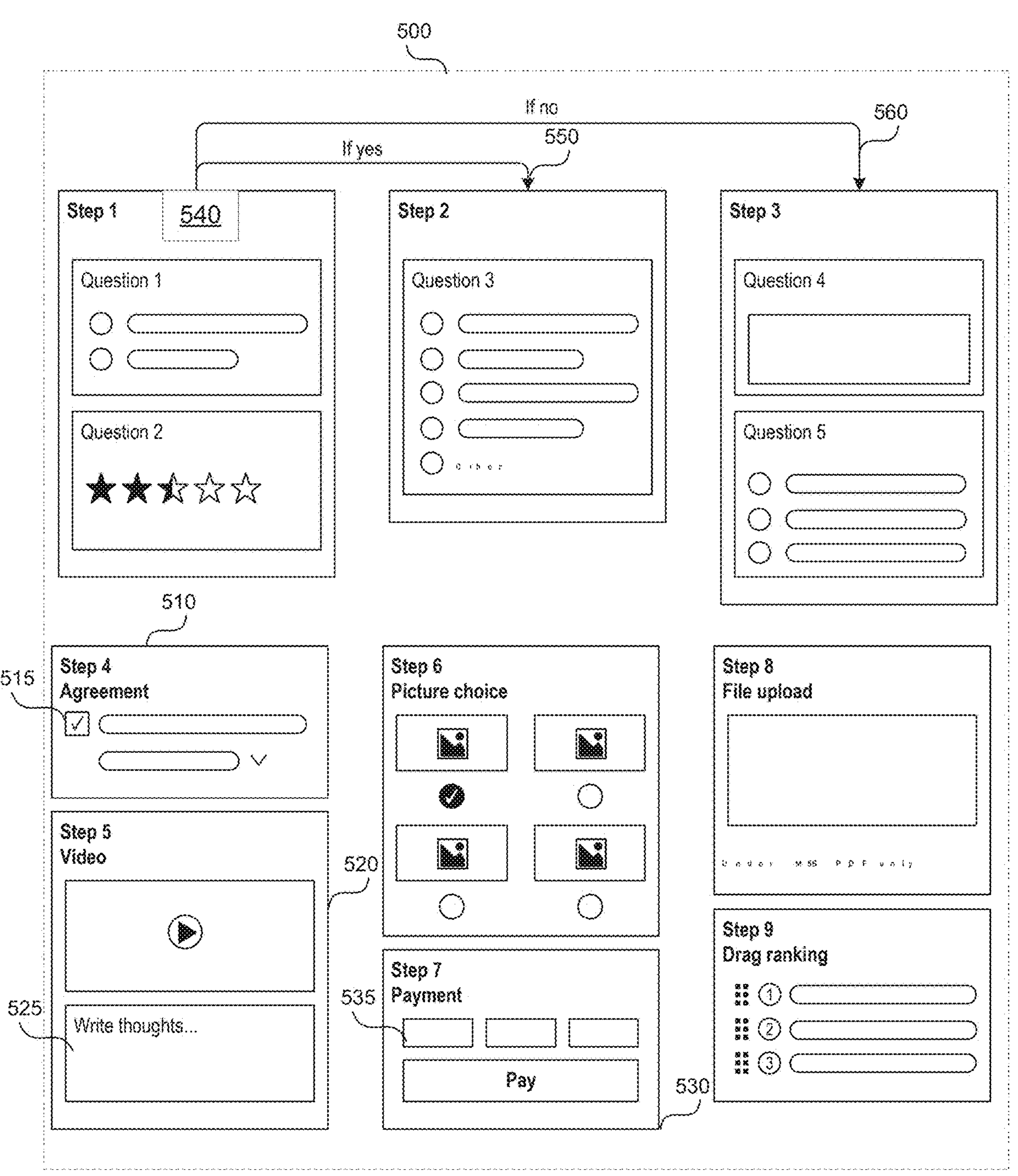
FIG. 5 shows various response types and conditional logic that a form can include.

FIG. 5 shows various response types and conditional logic that a form can include. The form 500 can include multiple questions, e.g., queries 510, 520, 530 (only three labeled for brevity). Each query can have a response 515, 525, 535 (only three labeled for brevity), and each response can have a type, such as a checkbox type associated with response 515, text type associated with response 525, numerical associated with response 535, matrix, ranked list, file, or multimedia type including image, video, audio, etc., as shown in FIG. 5.

The form 500 can include conditional logic, which can include a trigger 540 and an action 550, 560. For example, if the trigger 540 is satisfied, the form 500 can perform the action 550 and present question 2 to the user, while if the trigger is not satisfied, the form 500 can perform the action 560 and present question 3 to the user.

The trigger 540 can be satisfied when a particular answer is provided, such as when a particular box is checked, a particular text is entered, or a particular group of answers is provided. In another example, the trigger 540 can include a regular expression that can be satisfied when a response is entered, such as text, email, phone number, or URL. For example, the regular expression can be satisfied when the response equals 2, contains, starts with, or ends with a particular value. Alternatively, the regular expression can be satisfied when the response is different from, does not contain, does not start with, or does not end with a particular value. If the response is number date, the regular expression can be satisfied when the value equals, does not equal, >, <, <=, >=, is empty, or is not empty. If the response is on file or multimedia type, the trigger can be satisfied when the file or multimedia is empty or is not empty.

If the trigger 540 is satisfied, the form can perform an action 550, 560. The form can include jumping to a particular question, jumping to an end of the form, hiding or showing particular values in a particular question, and/or pre-selecting particular values in a particular question.

Figure 6:
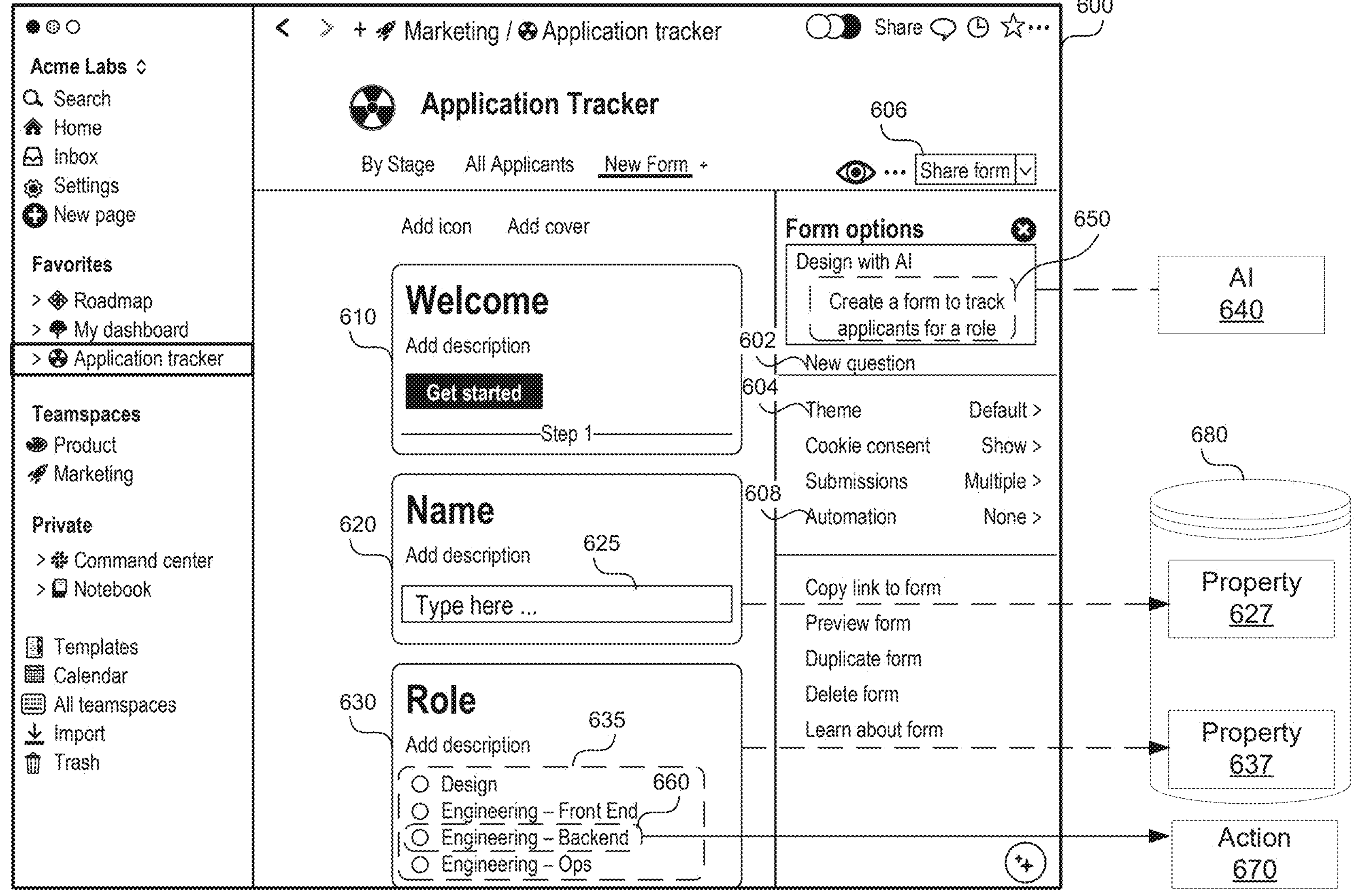
FIG. 6 shows an example form connected to a database.

FIG. 6 shows an example form connected to a database. The form 600 can be used to track applicants for a role. The form 600 can have a welcome section 610 explaining the function of the form, a query 620 asking for the name of the applicant, and query 630 asking for the role that the applicant is applying for.

The form 600 can be constructed using an artificial intelligence (AI) 640 by entering a natural language 650, such as "create a form to track applicants for a role." Alternatively, the form 600 can be designed manually. Even if the form 600 is designed by the AI 640, the client device 400 in FIG. 4 can modify the form by, for example, adding a new question through the user interface element 602 or removing an existing question 620, 630. In addition, the client device 400 can change the theme of the form 600 through the user interface element 604. Further, the client device can specify through the user interface elements 606 with whom to share the form 600.

The form 600 is connected to the datastore, e.g., database 680. Each response 625, 635 to the queries 620, 630 can modify a property 627, 637 in the database 680.

The client device 400 can also specify automations through the user interface element 608. The automation can include a trigger 660 and an action 670. When the trigger 660 is satisfied, the system performs the action 670.

The trigger 660 can be satisfied when a new form response is submitted. The trigger 660 can be satisfied when someone gets to a particular question, e.g., question 620, or when the form 600 is viewed. In a more specific example, the trigger 660 can be satisfied when somebody applies for an engineering-backend post, at which point the system can notify the engineering-backend manager through an email or a text message.

The trigger 660 can include regular expressions, which, in turn, can include logical operators such as AND, OR, and XOR. Regular expressions, often abbreviated as regex or regexp, are powerful tools used in programming and text processing for pattern matching within strings. They provide a concise and flexible means to identify, extract, and manipulate text based on specific patterns. Regular expressions are composed of a sequence of characters that define a search pattern, which can include literals, operators, and special characters. These patterns can be used for a variety of tasks, such as validating input, searching for specific text, replacing substrings, and parsing complex data. For example, a regex pattern like `^\d{3}-\d{2}-\d{4}$` can be used to validate a Social Security number format in the United States. For example, the triggers 660 can include regular expression using AND logic that is satisfied when there is a new form submitted, and the group to which the form is shared is "collections."

The action 670 performed after the trigger 660 is satisfied can include notifying a particular user or group of users on a particular channel, such as in Notion, in Slack, via email, etc. The particular user can be the creator associated with the form 600, editor associated with the form, analyst associated with the form, or any other user. The action 670 can assign a value to a property 627, 637 in the database 680 and/or can close the form 600. Further, the action 670 can create a new page in the database 680 and can link a particular response 625, 635 to a particular property 627, 637 in the database 680.

Figure 7:
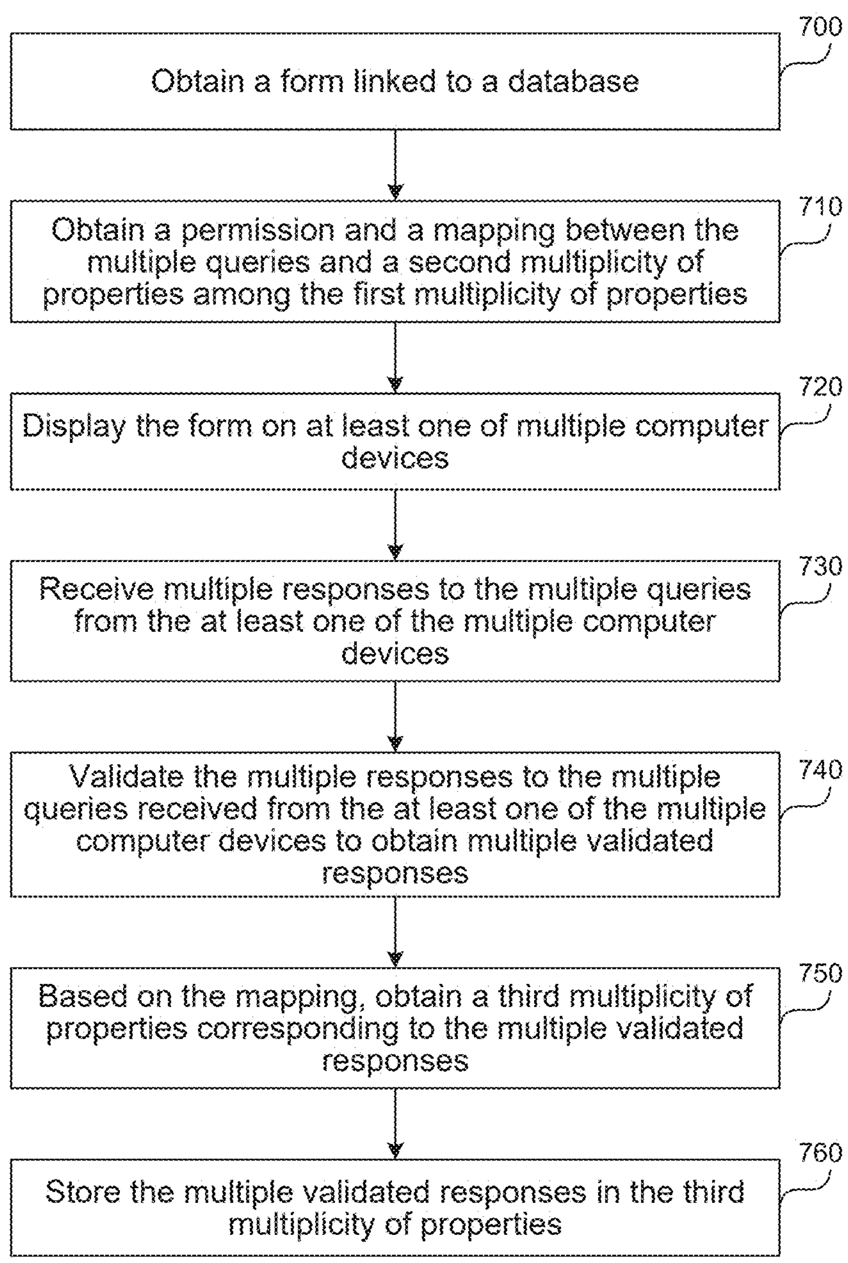
FIG. 7 is a flowchart of a method to enable users to edit particular properties in the datastore without giving all the users access to the whole datastore, thereby securing the datastore against inadvertent modification.

FIG. 7 is a flowchart of a method to enable users to edit particular properties in the datastore without giving all the users access to the whole datastore, thereby securing the datastore against inadvertent modification. A hardware or software processor executing instructions describing this application can, in step 700, obtain a form linked to a datastore. The form can be an online form. The datastore can include a first multiplicity of properties. The form, including multiple queries, can be configured to be shareable between multiple computer devices.

In step 710, the processor can obtain a permission and a mapping between the multiple queries and a second multiplicity of properties among the first multiplicity of properties. A property among the second multiplicity of properties corresponds to a query among the multiple queries. The permission can define the user and an operation the user can perform associated with the form. The mapping, through the form, can enable modification of the datastore only according to the permissions and the mapping.

In step 720, the processor can display the form on at least one of the multiple computer devices, where the form includes the multiple queries. A response to the query among the multiple queries modifies the first property among the second multiplicity of properties according to the mapping and eschews modifying a second property among the second multiplicity of properties not related to the query according to the mapping, thereby securing the datastore against inadvertent modification.

In step 730, the processor can receive multiple responses to the multiple queries from the at least one of the multiple computer devices, where the multiple responses include the response.

In step 740, the processor can validate the multiple responses to the multiple queries received from the at least one of the multiple computer devices to obtain multiple validated responses. In this step, the processor can also check permissions.

In step 750, based on the mapping, the processor can obtain a third multiplicity of properties corresponding to the multiple validated responses, where the third multiplicity of properties is a subset of the second multiplicity of properties.

In step 760, the processor can store the multiple validated responses in the third multiplicity of properties. In addition, the processor can analyze the stored responses to the multiple queries to determine whether the analysis triggers a particular action. Upon determining that the analysis triggers the particular action, the processor can perform the particular action.

The processor can obtain the permission defining the user and the operation the user can perform in response to the query, where the user includes a particular user, a domain name, or a group of users. The group of users can be a named grouped on a social media platform or can be the public. The operation can include creating the form, editing the form, deleting the form, providing the multiple responses to the form, and analyzing the multiple responses received from the form. The processor can receive a particular operation associated with the form from a particular user. The processor can determine whether the permission allows the particular user to perform the particular operation. Upon determining that the permission allows the particular user to perform the particular operation, the processor can perform the particular operation, while upon determining that the permission does not allow the particular user to perform the particular operation, the processor can deny performing the particular operation.

To validate the multiple responses, the processor can check whether the response type matches the property type and whether the property was deleted or the property changed type. The processor can obtain a type associated with the response among the multiple responses and a type associated with the property among the second multiplicity of properties. The type can be text, numerical, matrix, ranked list, or multimedia such as audio, video, or image. The mapping can establish a correspondence between the response and the property, where the type includes a text, numerical, matrix, ranked, or multimedia. The processor can determine whether the type associated with the response and the type associated with the property match. Upon determining that the type associated with the response and the type associated with the property match, the processor can validate the response. Upon determining that the type associated with the response does not match the type associated with the property, the processor can determine that the response is not valid.

In addition, to validate the multiple responses, the processor can, based on the mapping, obtain the property among the second multiplicity of properties corresponding to the response among the multiple responses. The processor can determine whether the property among the second multiplicity of properties is deleted from the datastore. Upon determining that the property among the second multiplicity of properties is deleted from the datastore, the processor can determine that the response is not valid.

The form can include conditional logic. Specifically, the processor can provide the form including a trigger and an action, where the trigger specifies a criterion that, when satisfied, causes the action to be performed. The criterion, described in this application, can describe a value that needs to be at least a part of the response among the multiple responses for the criterion to be satisfied. The action causes a performance an of operation associated with the form, where the operation includes a change in an appearance of the form, such as a change to a second response in the form. The processor can determine whether the criterion is satisfied, and upon determining that the criterion is satisfied, the processor can perform the action.

The processor can analyze the stored responses by determining whether a trigger is satisfied. The trigger can include a criterion or a logical combination of criteria, where the criterion includes at least one of a viewing of the form, a new submission associated with the form, accessing a particular query among the multiple queries, or receipt of a particular response among the multiple responses. Upon determining that the trigger is satisfied, the processor can perform the particular action, where the particular action includes sending a notification, changing a permission among the multiple permissions, changing a value associated with a property among the second multiplicity of properties, closing the form, or creating a new page in the datastore.

The processor can obtain a natural language description associated with the form. The processor can provide the natural language description to an artificial intelligence and obtain from the artificial intelligence the form with the multiple queries included. The processor can enable further modification of the form obtained from the artificial intelligence by allowing the user to specify to the natural language input additional modifications or by allowing the user to interact with the form through a graphical user interface.

Figure 8:
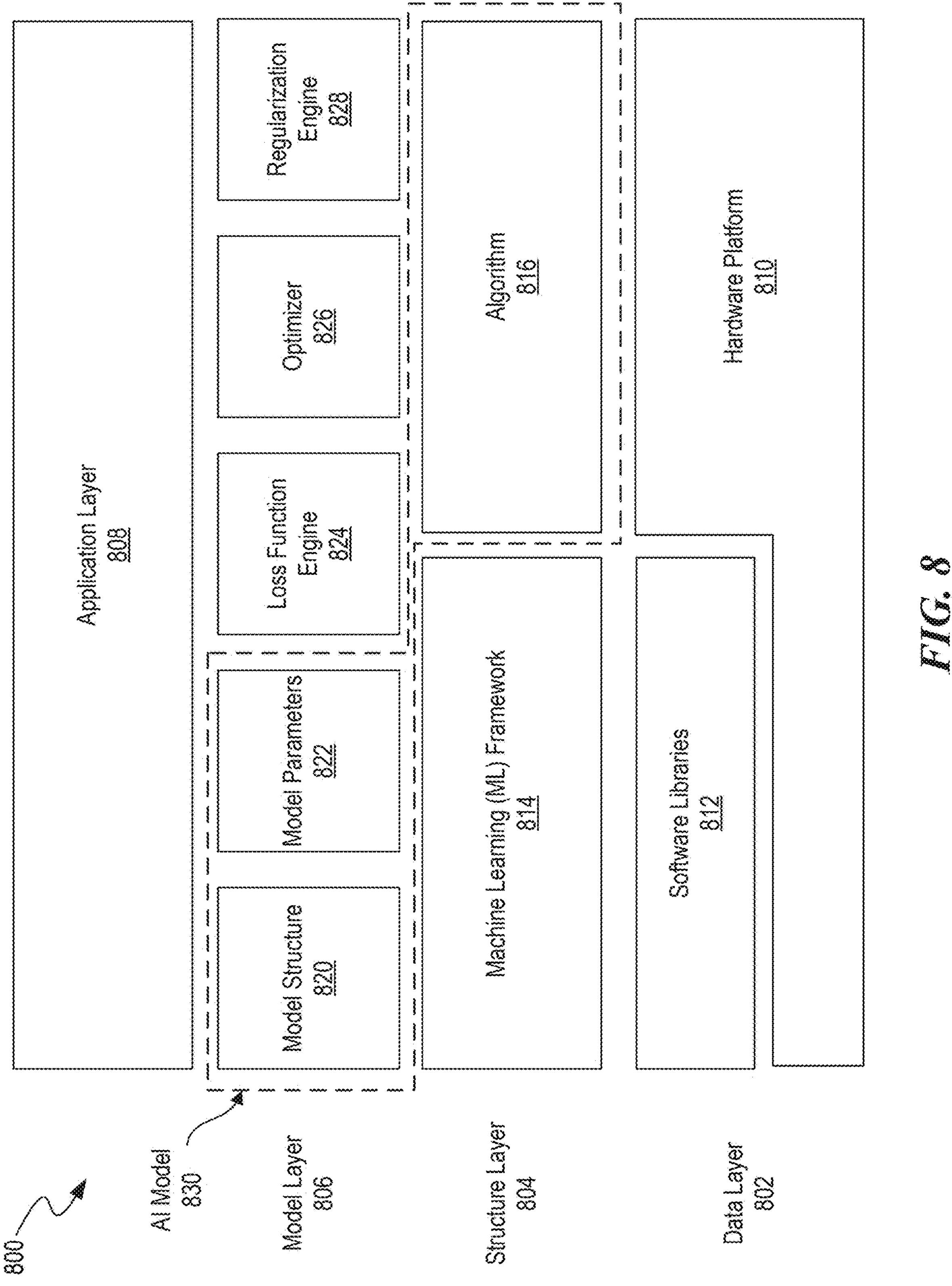
FIG. 8 is a block diagram illustrating an example AI system that can implement aspects of the present technology.

FIG. 8 is a block diagram illustrating an example AI system 800 that can implement aspects of the present technology. The AI system 800 is implemented using components of the example computer system 900 illustrated and described in more detail with reference to FIG. 9. For example, the AI system 800 can be implemented on the processor 902 using instructions 908 programmed in the memory 906 illustrated and described in more detail with reference to FIG. 9. Likewise, implementations of the AI system 800 can include different and/or additional components or be connected in different ways. FIG. 8 illustrates a layered architecture of AI system 800 that can perform various artificial intelligence functions as described in this application.

As shown, the AI system 800 can include a set of layers, which conceptually organize elements within an example network topology for the AI system's architecture to implement a particular AI model 830. Generally, an AI model 830 is a computer-executable program implemented by the AI system 800 that analyzes data to make predictions. Information can pass through each layer of the AI system 800 to generate outputs for the AI model 830. The layers can include a data layer 802, a structure layer 804, a model layer 806, and an application layer 808. The algorithm 816 of the structure layer 804 and the model structure 820 and model parameters 822 of the model layer 806 together form an example AI model 830. The optimizer 826, loss function engine 824, and regularization engine 828 work to refine and optimize the AI model 830, and the data layer 802 provides resources and support for application of the AI model 830 by the application layer 808.

The data layer 802 acts as the foundation of the AI system 800 by preparing data for the AI model 830. As shown, the data layer 802 can include two sub-layers: a hardware platform 810 and one or more software libraries 812. The hardware platform 810 can be designed to perform operations for the AI model 830 and include computing resources for storage, memory, logic and networking, such as the resources described in relation to FIG. 8. The hardware platform 810 can process amounts of data using one or more servers. The servers can perform backend operations such as matrix calculations, parallel calculations, machine learning (ML) training, and the like. Examples of servers used by the hardware platform 810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 810 can include computing resources (e.g., servers, memory, etc.) offered by a cloud services provider. The hardware platform 810 can also include computer memory for storing data about the AI model 830, application of the AI model 830, and training data for the AI model 830. The computer memory can be a form of random-access memory (RAM), such as dynamic RAM, static RAM, and non-volatile RAM.

The software libraries 812 can be thought of as suites of data and programming code, including executables, used to control the computing resources of the hardware platform 810. The programming code can include low-level primitives (e.g., fundamental language elements) that form the foundation of one or more low-level programming languages, such that servers of the hardware platform 810 can use the low-level primitives to carry out specific operations. The low-level programming languages do not require much, if any, abstraction from a computing resource's instruction set architecture, allowing them to run quickly with a small memory footprint. Examples of software libraries 812 that can be included in the AI system 800 include INTEL Math Kernel Library, NVIDIA cuDNN, EIGEN, and OpenBLAS.

The structure layer 804 can include an ML framework 814 and an algorithm 816. The ML framework 814 can be thought of as an interface, library, or tool that allows users to build and deploy the AI model 830. The ML framework 814 can include an open-source library, an API, a gradient-boosting library, an ensemble method, and/or a deep learning toolkit that work with the layers of the AI system to facilitate development of the AI model 830. For example, the ML framework 814 can distribute processes for application or training of the AI model 830 across multiple resources in the hardware platform 810. The ML framework 814 can also include a set of pre-built components that have the functionality to implement and train the AI model 830 and allow users to use pre-built functions and classes to construct and train the AI model 830. Thus, the ML framework 814 can be used to facilitate data engineering, development, hyperparameter tuning, testing, and training for the AI model 830. Examples of ML frameworks 814 that can be used in the AI system 800 include TENSORFLOW, PYTORCH, SCIKIT-LEARN, KERAS, LightGBM, RANDOM FOREST, and AMAZON WEB SERVICES.

The algorithm 816 can be an organized set of computer-executable operations used to generate output data from a set of input data and can be described using pseudocode. The algorithm 816 can include complex code that allows the computing resources to learn from new input data and create new/modified outputs based on what was learned. In some implementations, the algorithm 816 can build the AI model 830 through being trained while running computing resources of the hardware platform 810. This training allows the algorithm 816 to make predictions or decisions without being explicitly programmed to do so. Once trained, the algorithm 816 can run at the computing resources as part of the AI model 830 to make predictions or decisions, improve computing resource performance, or perform tasks. The algorithm 816 can be trained using supervised learning, unsupervised learning, semi-supervised learning, and/or reinforcement learning.

Using supervised learning, the algorithm 816 can be trained to learn patterns (e.g., map electronic communications to graph nodes) based on labeled training data. The training data may be labeled by an external user or operator. For instance, a user may collect a set of training data, such as from electronic communication systems, and the like. In an example implementation, training data can include native-format data collected (e.g., electronic communications) from various source computing systems described in relation to FIG. 4. Furthermore, training data can include preprocessed data generated by various engines of the system, as described in this application. The user may label the training data based on one or more classes and train the AI model 830 by inputting the training data to the algorithm 816. The algorithm determines how to label the new data based on the labeled training data. The user can facilitate collection, labeling, and/or input via the ML framework 814. In some instances, the user may convert the training data to a set of feature vectors for input to the algorithm 816. Once trained, the user can test the algorithm 816 on new data to determine if the algorithm 816 is predicting accurate labels for the new data. For example, the user can use cross-validation methods to test the accuracy of the algorithm 816 and retrain the algorithm 816 on new training data if the results of the cross-validation are below an accuracy threshold.

Supervised learning can involve classification and/or regression. Classification techniques involve teaching the algorithm 816 to identify a category of new observations based on training data and are used when input data for the algorithm 816 is discrete. Said differently, when learning through classification techniques, the algorithm 816 receives training data labeled with categories (e.g., classes) and determines how features observed in the training data relate to the categories. Once trained, the algorithm 816 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 816 is continuous. Regression techniques can be used to train the algorithm 816 to predict or forecast relationships between variables. To train the algorithm 816 using regression techniques, a user can select a regression method for estimating the parameters of the model. The user collects and labels training data that is input to the algorithm 816 such that the algorithm 816 is trained to understand the relationship between data features and the dependent variable(s). Once trained, the algorithm 816 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning-based preprocessing operations.

Under unsupervised learning, the algorithm 816 learns patterns from unlabeled training data. In particular, the algorithm 816 is trained to learn hidden patterns and insights of input data, which can be used for data exploration or for generating new data. Here, the algorithm 816 does not have a predefined output, unlike the labels output when the algorithm 816 is trained using supervised learning. Said another way, unsupervised learning is used to train the algorithm 816 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques include density-based methods, hierarchical-based methods, partitioning methods, and grid-based methods. In one example, the algorithm 816 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 816 may be trained to be an Isolation Forest, local outlier factor (LOF) algorithm, or k-nearest neighbor (k-NN) algorithm. Latent variable techniques involve relating observable variables to a set of latent variables. These techniques assume that the observable variables are the result of training on the latent variables and that the observable variables have nothing in common after controlling for the latent variables. Examples of latent variable techniques that may be used by the algorithm 816 include factor analysis, item response theory, latent profile analysis, and latent class analysis.

The model layer 806 implements the AI model 830 using data from the data layer and the algorithm 816 and ML framework 814 from the structure layer 804, thus enabling decision-making capabilities of the AI system 800. The model layer 806 includes a model structure 820, model parameters 822, a loss function engine 824, an optimizer 826, and a regularization engine 828.

The model structure 820 describes the architecture of the AI model 830 of the AI system 800. The model structure 820 defines the complexity of the pattern/relationship that the AI model 830 expresses. Examples of structures that can be used as the model structure 820 include decision trees, support vector machines, regression analyses, Bayesian networks, Gaussian processes, genetic algorithms, and artificial neural networks (or, simply, neural networks). The model structure 820 can include a number of structure layers, a number of nodes (or neurons) at each structure layer, and activation functions of each node. Each node's activation function defines how a node converts data received to data output. The structure layers may include an input layer of nodes that receive input data and an output layer of nodes that produce output data. The model structure 820 may include one or more hidden layers of nodes between the input and output layers. The model structure 820 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 822 represent the relationships learned during training and can be used to make predictions and decisions based on input data. The model parameters 822 can weight and bias the nodes and connections of the model structure 820. For instance, when the model structure 820 is a neural network, the model parameters 822 can weight and bias the nodes in each layer of the neural networks, such that the weights determine the strength of the nodes and the biases determine the thresholds for the activation functions of each node. The model parameters 822, in conjunction with the activation functions of the nodes, determine how input data is transformed into desired outputs. The model parameters 822 can be determined and/or altered during training of the algorithm 816.

The loss function engine 824 can determine a loss function, which is a metric used to evaluate the AI model's performance during training. For instance, the loss function engine 824 can measure the difference between a predicted output of the AI model 830 and the actual output of the AI model 830 and is used to guide optimization of the AI model 830 during training to minimize the loss function. The loss function may be presented via the ML framework 814, such that a user can determine whether to retrain or otherwise alter the algorithm 816 if the loss function is over a threshold. In some instances, the algorithm 816 can be retrained automatically if the loss function is greater than the threshold. Examples of loss functions include a binary-cross entropy function, hinge loss function, regression loss function (e.g., mean square error, or quadratic loss), mean absolute error function, smooth mean absolute error function, log-cosh loss function, and quantile loss function.

The optimizer 826 adjusts the model parameters 822 to minimize the loss function during training of the algorithm 816. In other words, the optimizer 826 uses the loss function generated by the loss function engine 824 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 826 used may be determined based on the type of model structure 820 and the size of data and the computing resources available in the data layer 802.

The regularization engine 828 executes regularization operations. Regularization is a technique that prevents over- and underfitting of the AI model 830. Overfitting occurs when the algorithm 816 is overly complex and too adapted to the training data, which can result in poor performance of the AI model 830. Underfitting occurs when the algorithm 816 is unable to recognize even basic patterns from the training data such that it cannot perform well on training data or on validation data. The optimizer 826 can apply one or more regularization techniques to fit the algorithm 816 to the training data properly, which helps constrain the resulting AI model 830 and improves its ability for generalized application. Examples of regularization techniques include lasso (L1) regularization, ridge (L2) regularization, and elastic (L1 and L2) regularization.

The application layer 808 describes how the AI system 800 is used to solve problems or perform tasks.

Computer System

Figure 9:
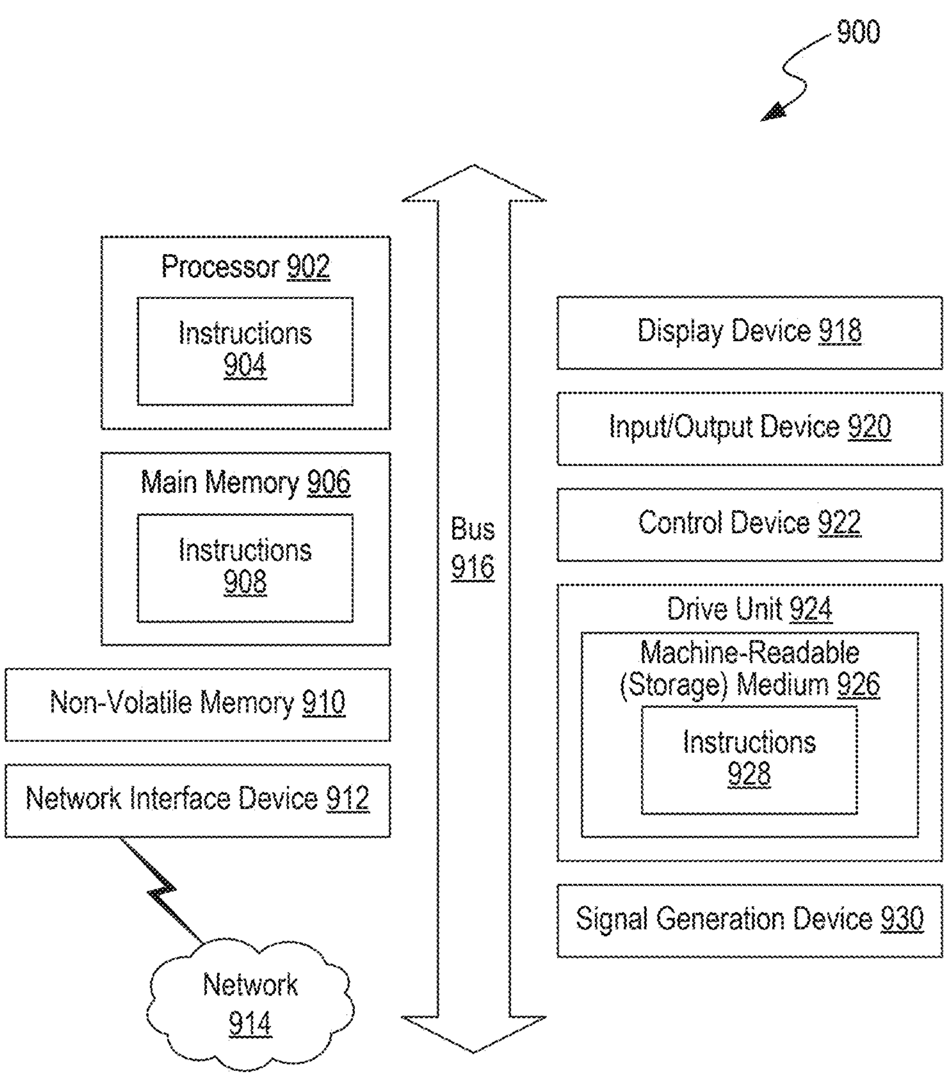
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the Figures and any other components described in this specification can be implemented.

The computer system 900 can take any suitable physical form. For example, the computer system 900 can share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 900. In some implementations, the computer system 900 can be an embedded computer system, a system-on-chip (SOC), a single-board computer (SBC) system, or a distributed system such as a mesh of computer systems or include one or more cloud components in one or more networks. Where appropriate, one or more computer systems 900 can perform operations in real time, near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

obtain, via a network connection for displaying on a graphical user interface of the system, an online form linked to a database,
  wherein the database includes a first multiplicity of properties,
  wherein the online form is shared between multiple computer devices,
  wherein the online form is a digital form provided on the graphical user interface, and
  wherein the online form includes multiple queries;

obtain permissions and a mapping between the multiple queries and a second multiplicity of properties among the first multiplicity of properties,
  wherein a first property among the second multiplicity of properties corresponds to a query among the multiple queries,
  wherein the permissions define a user and an operation the user can perform associated with the online form,
  wherein the mapping, through the online form, restricts modification of the database to only modifications according to the permissions and the mapping;

display the online form on at least one of the multiple computer devices,
  wherein the online form includes the multiple queries,
  wherein a response to the query among the multiple queries modifies the first property among the second multiplicity of properties according to the mapping and eschews modifying a second property among the second multiplicity of properties not related to the query according to the mapping, thereby securing the database against inadvertent modification;

receive multiple responses to the multiple queries from the at least one of the multiple computer devices,
  wherein the multiple responses include the response;

validate the multiple responses to the multiple queries received from the at least one of the multiple computer devices to obtain multiple validated responses;

based on the mapping, obtain a third multiplicity of properties corresponding to the multiple validated responses, wherein the third multiplicity of properties is a subset of the second multiplicity of properties;

store the multiple validated responses in the third multiplicity of properties;

analyze the stored responses to the multiple queries to determine whether a particular action is triggered; and upon determining that the particular action is triggered, perform the particular action.

2. The non-transitory, computer-readable storage medium of claim 1, wherein the instructions to validate the multiple responses comprise instructions to:

obtain a type associated with the response among the multiple responses and a type associated with the first property among the second multiplicity of properties, wherein the mapping establishes a correspondence between the response and the first property, wherein the type includes a text, numerical, matrix, ranked, or multimedia;

determine whether the type associated with the response and the type associated with the first property match;

upon determining that the type associated with the response and the type associated with the first property match, validate the response; and upon determining that the type associated with the response does not match the type associated with the first property, determine that the response is not valid.

3. The non-transitory, computer-readable storage medium of claim 1, wherein the instructions to validate the multiple responses comprise instructions to:

based on the mapping, obtain the first property among the second multiplicity of properties corresponding to the response among the multiple responses;

determine whether the first property among the second multiplicity of properties is deleted from the database; and upon determining that the first property among the second multiplicity of properties is deleted from the database, determine that the response is not valid.

4. The non-transitory, computer-readable storage medium of claim 1, comprising instructions to:

provide the online form including a trigger and an action, wherein the trigger specifies a criterion that, when satisfied, causes the action to be performed, wherein the criterion describes a value that needs to be at least a part of the response among the multiple responses for the criterion to be satisfied, wherein the action performs an operation associated with the online form, wherein the operation includes a change in an appearance of the online form or a change to a second response in the online form;

determine whether the criterion is satisfied; and upon determining that the criterion is satisfied, perform the action.

5. The non-transitory, computer-readable storage medium of claim 1, comprising instructions to:

analyze the stored responses by determining whether a trigger is satisfied, wherein the trigger includes a criterion or a logical combination of criteria, wherein the criterion includes at least one of: a viewing of the online form, a new submission associated with the online form, accessing a particular query among the multiple queries, or receipt of a particular response among the multiple responses; and upon determining that the trigger is satisfied, perform the particular action, wherein the particular action includes sending a notification, changing the permissions, changing a value associated with the first property among the second multiplicity of properties, closing the online form, or creating a new page in the database.

6. The non-transitory, computer-readable storage medium of claim 1, wherein the instructions to obtain the online form comprise instructions to:

obtain a natural language description associated with the online form;

provide the natural language description to an artificial intelligence; and obtain from the artificial intelligence the online form.

7. A method comprising:

obtaining, via a network connection for displaying on a graphical user interface of a system, an online form linked to a datastore, wherein the datastore includes a first multiplicity of properties, and wherein the online form is shared between multiple computer devices, wherein the online form is a digital form provided on the graphical user interface, and wherein the online form includes multiple queries;

obtaining a permission and a mapping between the multiple queries and a second multiplicity of properties among the first multiplicity of properties, wherein a first property among the second multiplicity of properties corresponds to a query among the multiple queries, wherein the permission defines a user and an operation the user can perform associated with the online form, wherein the mapping, through the online form, restricts modification of the datastore to only modifications according to the permission and the mapping;

displaying the online form on at least one of the multiple computer devices, wherein the online form includes the multiple queries, wherein a response to the query among the multiple queries modifies the first property among the second multiplicity of properties according to the mapping and eschews modifying a second property among the second multiplicity of properties not related to the query according to the mapping, thereby securing the datastore against inadvertent modification;

receiving multiple responses to the multiple queries from the at least one of the multiple computer devices, wherein the multiple responses include the response;

validating the multiple responses to the multiple queries received from the at least one of the multiple computer devices to obtain multiple validated responses;

based on the mapping, obtaining a third multiplicity of properties corresponding to the multiple validated responses, wherein the third multiplicity of properties is a subset of the second multiplicity of properties; and storing the multiple validated responses in the third multiplicity of properties.

8. The method of claim 7, comprising:

obtaining the permission defining the user and the operation the user can perform in response to the query, wherein the user includes a particular user, a domain name, or a group of users, wherein the operation includes creating the online form, editing the online form, deleting the online form, providing the multiple responses to the online form, and analyzing the multiple responses received from the online form;

receiving a particular operation associated with the online form from the user;

determining whether the permission allows the user to perform the particular operation;

upon determining that the permission allows the user to perform the particular operation, performing the particular operation; and upon determining that the permission does not allow the user to perform the particular operation, denying performing the particular operation.

9. The method of claim 7, comprising:

obtaining a type associated with the response among the multiple responses and a type associated with the first property among the second multiplicity of properties, wherein the mapping establishes a correspondence between the response and the first property, wherein the type includes a text, numerical, matrix, ranked, or multimedia;

determining whether the type associated with the response and the type associated with the first property match;

upon determining that the type associated with the response and the type associated with the first property match, validating the response; and upon determining that the type associated with the response does not match the type associated with the first property, determining that the response is not valid.

10. The method of claim 7, wherein validating the multiple responses comprises:

based on the mapping, obtaining the first property among the second multiplicity of properties corresponding to the response among the multiple responses;

determining whether the first property among the second multiplicity of properties is deleted from the datastore; and upon determining that the first property among the second multiplicity of properties is deleted from the datastore, determining that the response is not valid.

11. The method of claim 7, comprising:

providing the online form including a trigger and an action, wherein the trigger specifies a criterion that, when satisfied, causes the action to be performed, wherein the criterion describes a value that needs to be at least a part of the response among the multiple responses for the criterion to be satisfied, wherein the action performs a second operation associated with the online form, wherein the operation includes a change in an appearance of the online form;

determining whether the criterion is satisfied; and upon determining that the criterion is satisfied, performing the action.

12. The method of claim 7, comprising:

analyzing the stored responses by determining whether a trigger is satisfied, wherein the trigger includes a criterion or a logical combination of criteria, wherein the criterion includes at least one of: a viewing of the online form, a new submission associated with the online form, accessing a particular query among the multiple queries, or receipt of a particular response among the multiple responses; and upon determining that the trigger is satisfied, performing a particular action, wherein the particular action includes sending a notification, changing the permission, changing a value associated with a property among the second multiplicity of properties, closing the online form, or creating a new page in the datastore.

13. The method of claim 7, wherein obtaining the online form comprises:

obtaining a natural language description associated with the online form;

providing the natural language description to an artificial intelligence; and obtaining from the artificial intelligence the online form.

14. A system comprising:

at least one hardware processor; and at least one non-transitory memory storing instructions, which, when executed by the at least one hardware processor, cause the system to:

obtain, via a network connection for displaying on a graphical user interface of the system,-an online form linked to a datastore, wherein the datastore includes a first multiplicity of properties, and wherein the online form is shared between multiple computer devices, wherein the online form is a digital form provided on the graphical user interface, and wherein the online form includes multiple queries;

obtain a permission and a mapping between the multiple queries and a second multiplicity of properties among the first multiplicity of properties, wherein a first property among the second multiplicity of properties corresponds to a query among the multiple queries, wherein the permission defines a user and an operation the user can perform associated with the online form, wherein the mapping, through the online form, restrict modification of the datastore to only modifications according to the permission and the mapping;

display the online form on at least one of the multiple computer devices, wherein the online form includes the multiple queries, wherein a response to the query among the multiple queries modifies the first property among the second multiplicity of properties according to the mapping and eschews modifying a second property among the second multiplicity of properties not related to the query according to the mapping, thereby securing the datastore against inadvertent modification;

receive multiple responses to the multiple queries from the at least one of the multiple computer devices, wherein the multiple responses include the response;

validate the multiple responses to the multiple queries received from the at least one of the multiple computer devices to obtain multiple validated responses;

based on the mapping, obtain a third multiplicity of properties corresponding to the multiple validated responses, wherein the third multiplicity of properties is a subset of the second multiplicity of properties; and store the multiple validated responses in the third multiplicity of properties.

15. The system of claim 14, comprising instructions to:

obtain the permission defining the user and the operation the user can perform in response to the query, wherein the user includes a particular user, a domain name, or a group of users, wherein the operation includes creating the online form, editing the online form, deleting the form, providing the multiple responses to the online form, and analyzing the multiple responses received from the online form;

receive a particular operation associated with the online form from the user;

determine whether the permission allows the user to perform the particular operation;

upon determining that the permission allows the user to perform the particular operation, perform the particular operation; and upon determining that the permission does not allow the user to perform the particular operation, deny performing the particular operation.

16. The system of claim 14, wherein the instructions to validate the multiple responses comprise instructions to:

obtain a type associated with the response among the multiple responses and a type associated with the first property among the second multiplicity of properties, wherein the mapping establishes a correspondence between the response and the first property, wherein the type includes a text, numerical, matrix, ranked, or multimedia;

determine whether the type associated with the response and the type associated with the first property match;

upon determining that the type associated with the response and the type associated with the first property match, validate the response; and upon determining that the type associated with the response does not match the type associated with the first property, determine that the response is not valid.

17. The system of claim 14, wherein the instructions to validate the multiple responses comprise instructions to:

based on the mapping, obtain the first property among the second multiplicity of properties corresponding to the response among the multiple responses;

determine whether the first property among the second multiplicity of properties is deleted from the datastore; and upon determining that the first property among the second multiplicity of properties is deleted from the datastore, determine that the response is not valid.

18. The system of claim 14, comprising instructions to:

provide the online form including a trigger and an action, wherein the trigger specifies a criterion that, when satisfied, causes the action to be performed, wherein the criterion describes a value that needs to be at least a part of the response among the multiple responses for the criterion to be satisfied, wherein the action performs a second operation associated with the online form, wherein the operation includes a change in an appearance of the online form;

determine whether the criterion is satisfied; and upon determining that the criterion is satisfied, perform the action.

19. The system of claim 14, comprising instructions to:

analyze the stored responses by determining whether a trigger is satisfied, wherein the trigger includes a criterion or a logical combination of criteria, wherein the criterion includes at least one of: a viewing of the online form, a new submission associated with the online form, accessing a particular query among the multiple queries, or receipt of a particular response among the multiple responses; and upon determining that the trigger is satisfied, perform a particular action, wherein the particular action includes sending a notification, changing the permission, changing a value associated with a property among the second multiplicity of properties, closing the online form, or creating a new page in the datastore.

20. The system of claim 14, wherein the instructions to obtain the online form comprise instructions to:

obtain a natural language description associated with the online form;

provide the natural language description to an artificial intelligence; and obtain from the artificial intelligence the online form.

* * * * *